(12) United States Patent
Cook et al.

(10) Patent No.: US 7,111,826 B2
(45) Date of Patent: Sep. 26, 2006

(54) PULLING APPARATUS

(76) Inventors: Robert D. Cook, 26430 Valley View Dr., Cheshire, OR (US) 97414; Thomas H. Kessler, 365 E. 50th, Eugene, OR (US) 97405

( * ) Notice: Subject to any disclaimer, the term of this patent is extended or adjusted under 35 U.S.C. 154(b) by 458 days.

(21) Appl. No.: 10/003,393

(22) Filed: Oct. 22, 2001

(65) Prior Publication Data

US 2003/0075711 A1    Apr. 24, 2003

(51) Int. Cl.
*B66D 1/00* (2006.01)
(52) U.S. Cl. .................... 254/329; 254/342; 254/380
(58) Field of Classification Search ............... 254/329, 254/334, 335, 342, 362, 380, 413
See application file for complete search history.

(56) References Cited

U.S. PATENT DOCUMENTS

| 3,797,681 | A | * | 3/1974 | Brettrager | 414/559 |
| 3,976,216 | A | * | 8/1976 | Lambert | 215/307 |
| 4,290,584 | A | * | 9/1981 | Eckels et al. | 254/380 |
| 4,807,899 | A | * | 2/1989 | Belcher | 280/477 |
| 5,072,962 | A | * | 12/1991 | Webb | 280/414.1 |
| 5,149,056 | A | * | 9/1992 | Jones | 254/134.3 FT |
| 5,176,365 | A | * | 1/1993 | Best | 254/342 |
| 5,820,317 | A | * | 10/1998 | Van Troba | 408/136 |
| 5,975,499 | A | * | 11/1999 | Ostrobrod | 254/332 |
| 5,984,273 | A | | 11/1999 | Ray | |
| 6,050,548 | A | * | 4/2000 | Leger | 254/326 |
| 6,086,083 | A | * | 7/2000 | Wilks | 280/479.1 |
| 6,189,866 | B1 | * | 2/2001 | Harkins et al. | 254/332 |
| 6,283,455 | B1 | * | 9/2001 | Ascherin et al. | 254/334 |
| 6,286,815 | B1 | | 9/2001 | Ray | |
| 6,634,588 | B1 | * | 10/2003 | Jackson | 242/323 |

* cited by examiner

*Primary Examiner*—Emmanuel M Marcelo

(57) ABSTRACT

An apparatus includes a sleeve comprising a nub, the sleeve sized to receive a bar. The apparatus further includes a movable spindle with a bracket. The bracket is sized to fit over either of the bar and the nub.

6 Claims, 7 Drawing Sheets

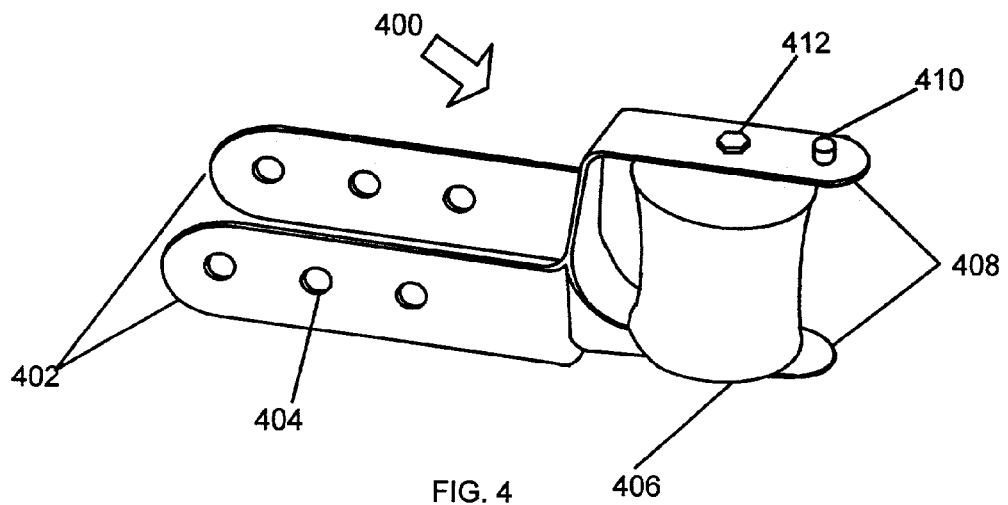
FIG. 4
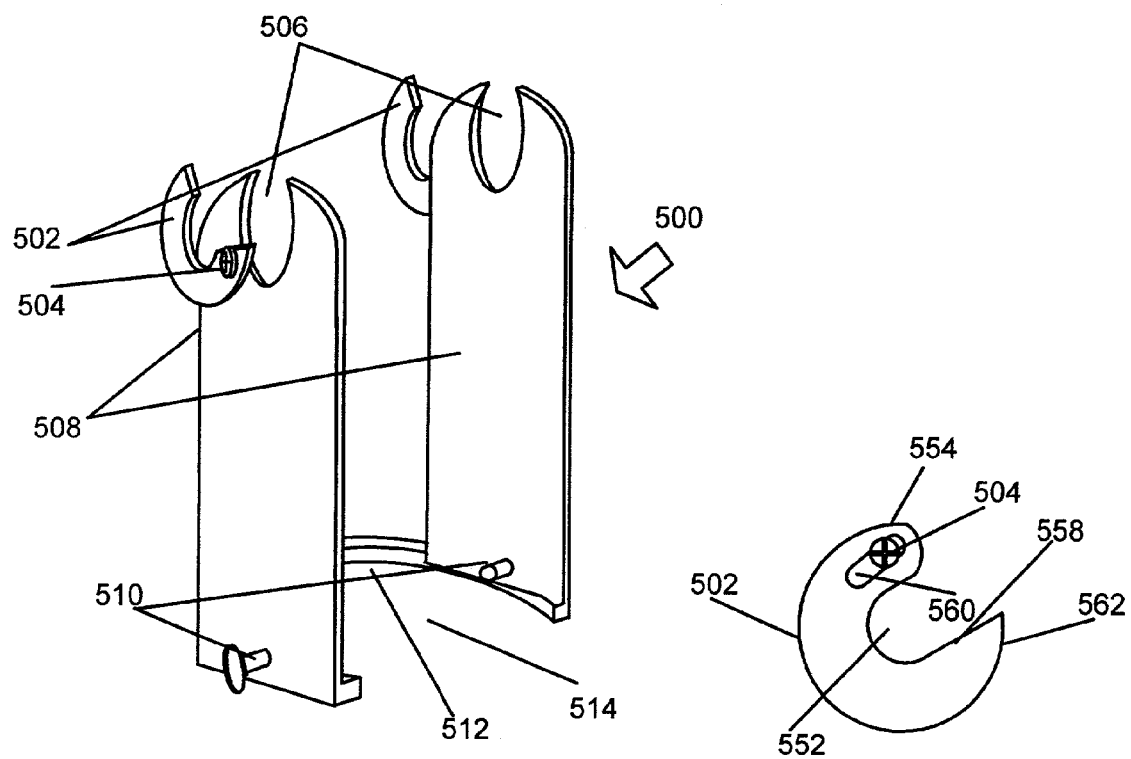
FIG. 5A
FIG. 5B

PULLING APPARATUS

FIELD

The invention relates generally to machines to pull rope, wire, and cable.

BACKGROUND

The generation of pulling force is a basic operation of physical work. Generally, there has been a trade off between the force which may be applied to a pulling operation, and the portability and flexibility of the machine applied to perform the pulling. For example, machines have been developed which are capable of exerting very high pulling forces on a rope or cable. However, these machines tend to be heavy and difficult to transport. Pulling machines also tend to be specialized to particular applications.

U.S. Pat. No. 5,984,273 decribes a pulling apparatus wherein a right-angle drill may be mounted upon a spindle fixed to a length of bar. The right-angle drill may be powered on by toggling a lever switch to depress a trigger of the drill. The drill motor directly drives the spindle around which one or more turns of rope may be made. The force of the drill may be applied to turning the spindle to assist an operator with pulling on the end of the rope. A disadvantage of this apparatus is that the force applied to the spindle is limited to the force which may be directly output by the drill. Furthermore the configuration of the apparatus may be less flexible than desired for a variety of pulling applications.

SUMMARY

An apparatus includes a sleeve comprising a nub, the sleeve sized to receive a bar. The apparatus further includes a movable spindle with a bracket. The bracket is sized to fit over either of the bar and the nub.

FIGURES

The invention may be better understood with reference to the following figures in light of the accompanying description. The present invention, however, is limited only by the scope of the claims at the concluding portion of the specification.

FIG. 4 shows another embodiment of a forearm pulley assembly in accordance with the present invention.

FIG. 5A shows an embodiment of a bushing assembly in accordance with the present invention.

FIG. 5B shows one embodiment of a retaining element in accordance with the present invention.

DESCRIPTION

In the following description, numerous references to "one embodiment" or "an embodiment" do not necessarily refer to the same embodiment, although they may. In the figures, like numbers refer to like elements.

Figure 1:
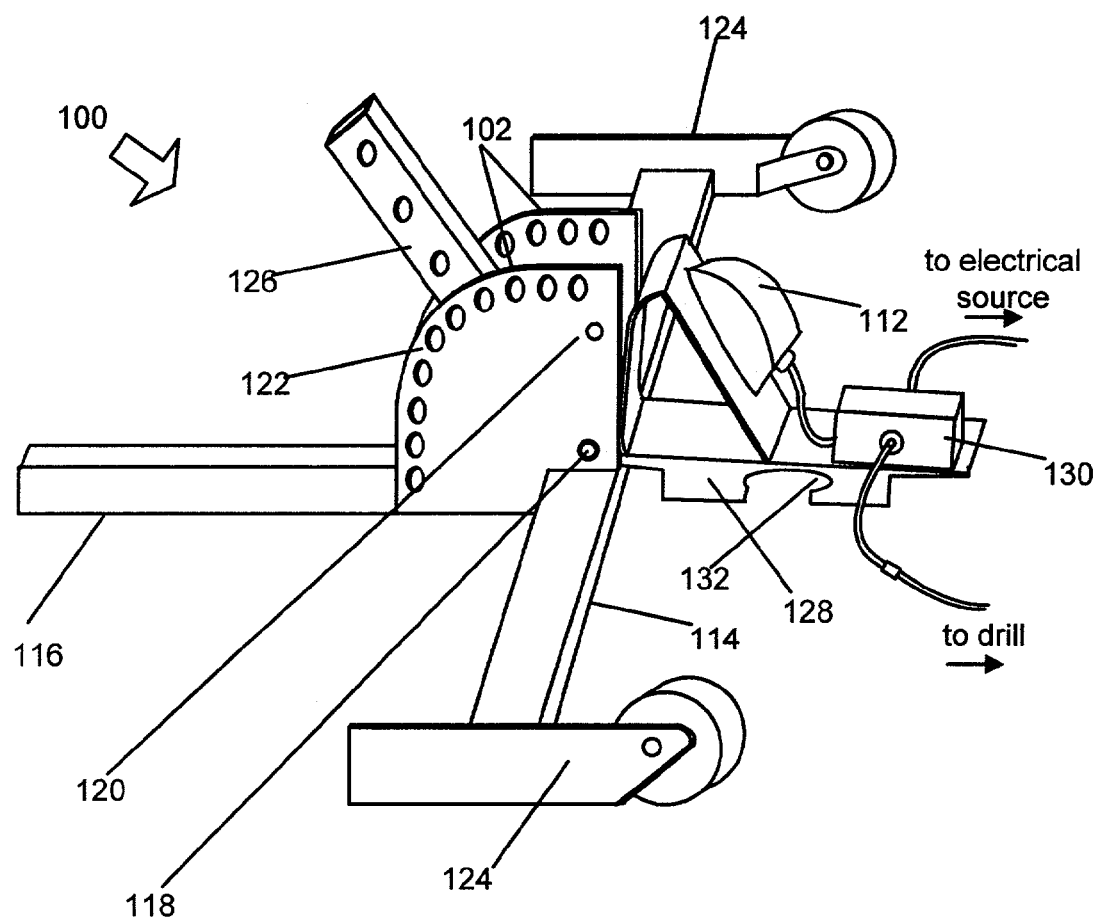
FIG. 1 shows a base assembly embodiment of a pulling apparatus in accordance with the present invention.

FIG. 1 shows a base assembly embodiment 100 of a pulling apparatus in accordance with the present invention. Base members 114, 116 provide a stable platform for the mounting and assembly of other base elements. Wheel assembly 124 provides mobility to the base assembly 100. In one embodiment, member 116 may be coupled at different locations along the length of member 114, providing flexibility in the configuration of the base assembly 100 according to the constraints of the work environment. For example, in corner environments it may be desirable to locate member 116 closer to an end of member 114 so that the other elements of the apparatus are mounted closer (or further) from a wall, panel, or other obstruction. Of course, the base members 116 and 114 could also be joined at a fixed location.

Protractors 102 are mounted to the base elements 114, 116 and provide a pivot track for the bar 126. The bar 126 may be pivotally mounted to the protractors 102 by way of pivot axle 118 and may be secured at a selected pivot angle by use of a pin or other securing mechanism through the holes 122 in the protractors 102. Of course, those skilled in the art will appreciate that any number of well-known fastening techniques not involving the holes 122 may also be applied. This is true in general throughout this description where embodiments comprising the use of pins or other fasteners inserted through holes is described.

A foot pedal assembly 128 is provided comprising a foot pedal 112 and a relay box 130. The relay box 130 is response to the operation of the foot pedal 112 to electrically couple an electrical source to a source of drive power. For example, depressing the foot pedal 112 may cause the relay box 130 to couple electricity from an electrical outlet to the motor of a power drill. The foot pedal assembly 128 may be abutted to the base member 114 as shown in FIG. 1, or, in another embodiment, may be positioned at a distance from the base member 114 (for example, many feet away). Alternately, the foot pedal assembly 128 may be vertically mounted by fitting the slot 132 over the mounting peg 120 of each protractor 102.

Figure 2:
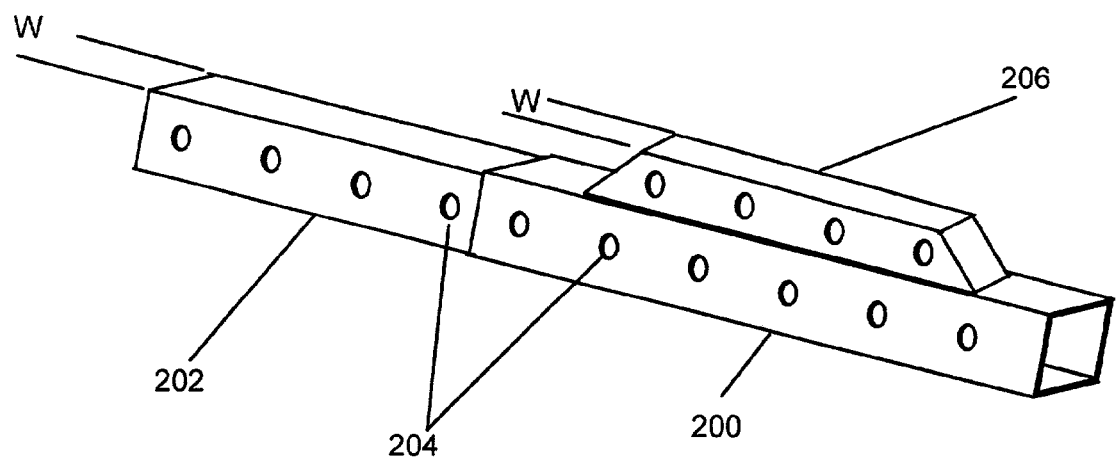
FIG. 2 shows an embodiment of a sleeve to receive an extension bar in accordance with the present invention.

FIG. 2 shows an embodiment of a sleeve 200 to receive an extension bar 202 in accordance with the present invention. The sleeve 200 may comprise an interior perimeter dimension W sized to receive the extension bar 202 in one end and the bar 126 of the base assembly in another end. In one embodiment the sleeve 200 may be fixed to the bars 202, 126 by way of pins or other fasteners through holes 204. The sleeve 200 further comprises a nub 206 having a width W substantially the same as the width of the bars 126, 202. The use and purpose of the nub 206 is explained more fully in conjunction with the description of the gear box embodiment 700 of FIG. 7.

Figure 8:
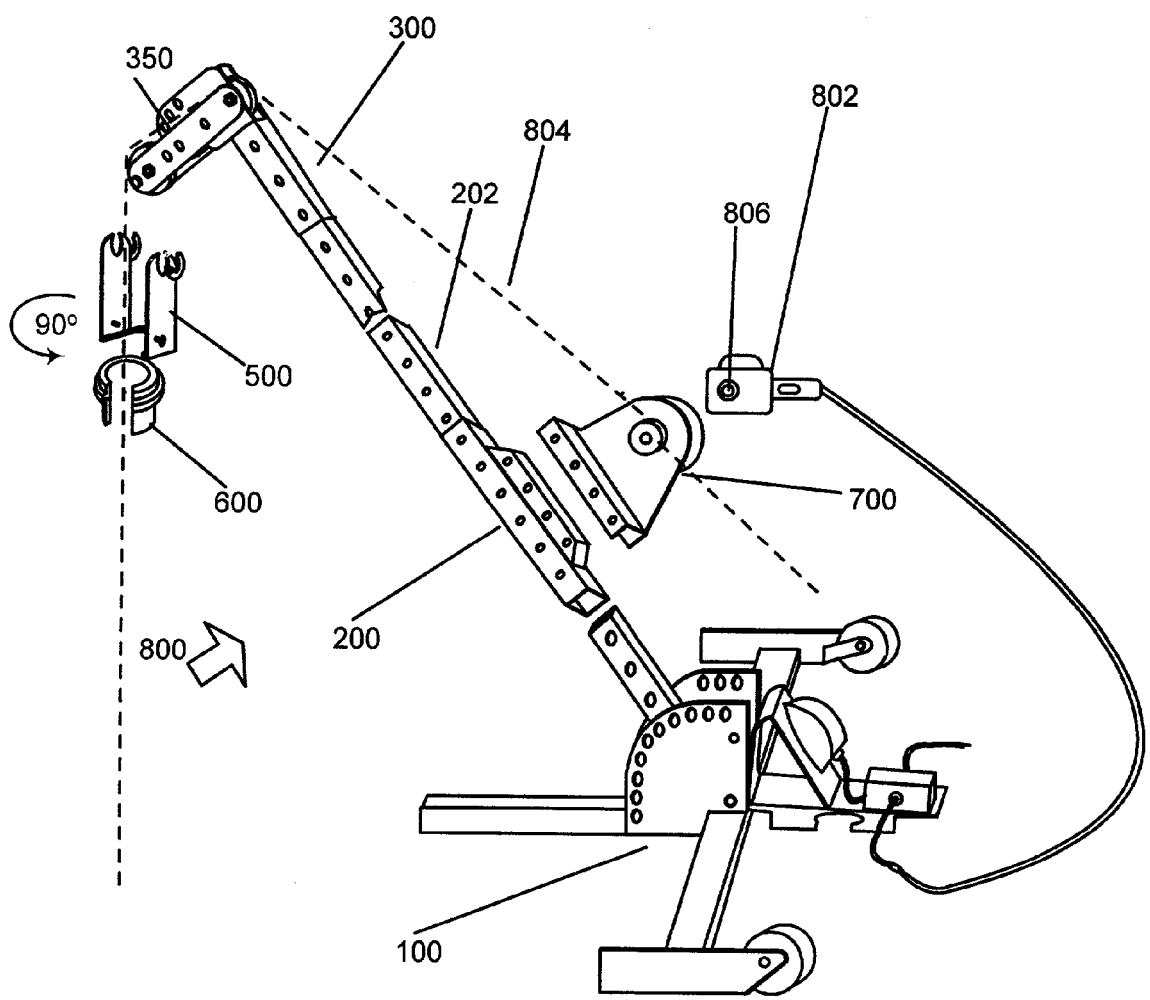
FIG. 8 shows an embodiment of a pulling apparatus in accordance with the present invention.

Referring momentarily to FIG. 8, in one embodiment 800 of a pulling apparatus the sleeve 200 may receive the bar 126 of the base assembly in one end and the extension bar 202 in another end, forming an extensible boom. Multiple sleeves 200 and extension bars 202 may be combined in this fashion to form a boom of a desired length suitable to a particular pulling operation.

Figure 3A:
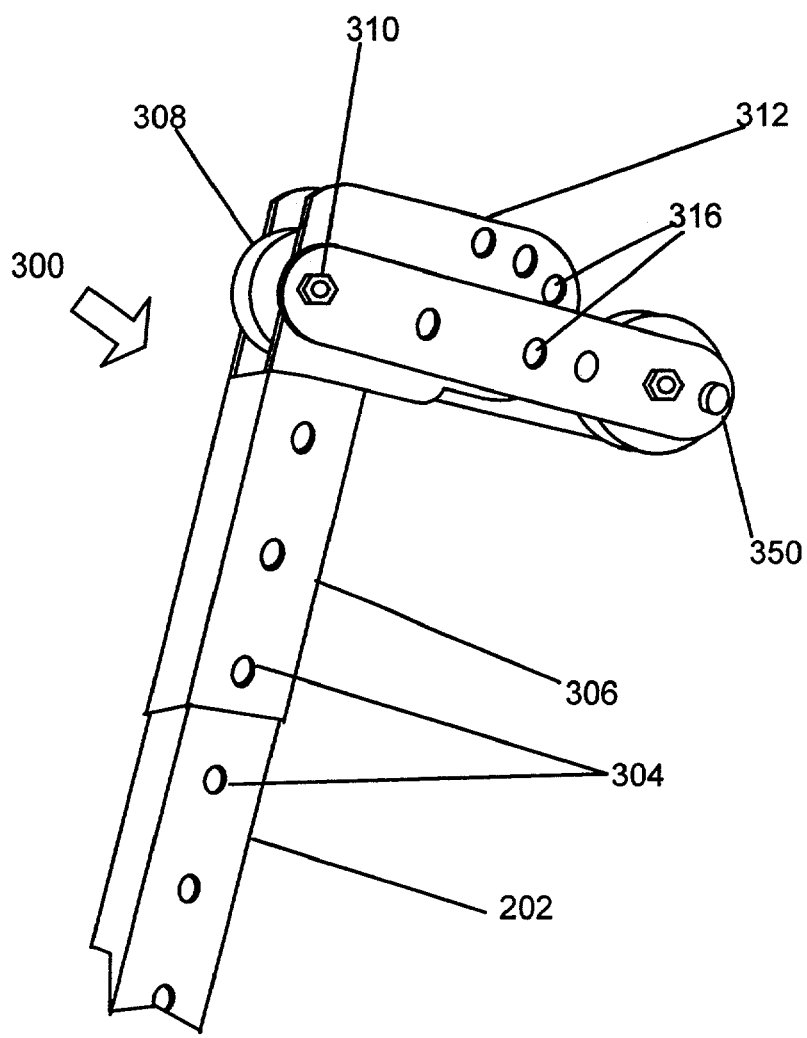
FIG. 3A shows one embodiment of a pulley assembly in accordance with the present invention.

FIG. 3A shows one embodiment 300 of a pulley assembly in accordance with the present invention. The pulling assembly 300 comprises a sleeve 306 to receive an end of the extension bar 202. The sleeve 306 and extension bar 202 may be secured by way of pins or other fasteners through the holes 304. A first pulley 308 is mounted by way of an axle 310 between the protractors 312. One embodiment of a forearm pulley assembly 350 may be mounted to the protractors 312 by way of the axle 310 and a pin or other fastener through the holes 316.

Referring again to FIG. 8, the apparatus embodiment 800 includes the pulley assembly 300 with the forearm assembly 350 mounted at an end of a boom formed by the bars 126, 202 and the sleeve 200.

Figure 3B:
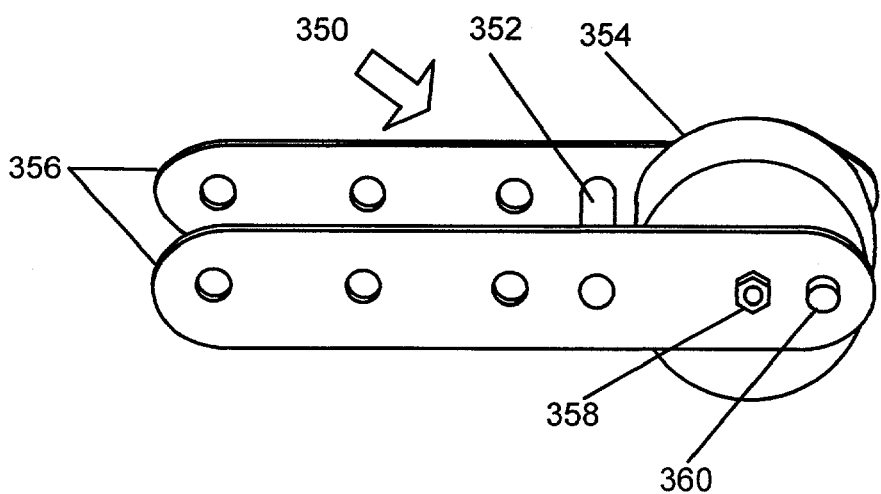
FIG. 3B shows details of the embodiment of a forearm pulley assembly in accordance with the present invention.

FIG. 3B shows details of the embodiment 350 of a forearm pulley assembly in accordance with the present invention. The prongs 356 bracket a pulley 354 rotationally secured to the prongs by way of the axle 358. The bar 352 provides stability to the assembly 350. A mounting peg 360 on each of the prongs 356 provide for the mounting of a bushing assembly as is more filly described in conjunction with FIGS. 5A and 5B.

FIG. 4 shows another embodiment 400 of a forearm pulley assembly in accordance with the present invention. The prongs 402 form a bracket by which the forearm 400 may be coupled to the protractors 312 of the pulley assembly 300 using pins or other fasteners through the holes 404. Another bracket 408 provides a mount for a second pulley 406 rotationally mounted by way of the axle 412. The axle 412 may be substantially orthogonal to the axle 310 of the pulley assembly 300, thus providing a mechanism by which pulling force along a rope, cable, or other pulling material may be directed sideways (orthogonal) to an axis of the pulley assembly 300 and the boom formed by the sleeves 200 and bars 202, 126 (again, refer to FIG. 8). A mounting peg 410 on each prong of the bracket 408 provides for the mounting of a bushing assembly, as more fully described in conjunction with FIGS. 5A and 5B.

FIG. 5A shows an embodiment 500 of a bushing assembly in accordance with the present invention. Prongs 508 each comprise a slot 506. The slots 506 may be positioned around the mounting pegs 360, 410 of the various embodiments of the forearm assembly (for example, embodiments 350 and 400). The retaining elements 502 may be rotated and translated about the set screws 504 to enclose the pegs 360,410. The set screws 504 may then be tightened to secure the bushing assembly 500 to the forearm assembly.

FIG. 8 shows an alignment of the bushing assembly embodiment 500 with an embodiment 350 of the forearm assembly. The bushing assembly 500 further comprises an arch 512 to form a bay 514 between the prongs to receive a bushing. Thumb screws 510, or some other fastening mechanism, may be employed to secure the bushing within the bay 514 formed by the arch 512.

FIG. 5B shows one embodiment 502 of a retaining element in accordance with the present invention. Element 502 comprises a slot 552 to receive a mounting peg 360, 410 of the forearm assembly. The slot 552 may be formed by prongs 554 and 562 of the element 502. The prong 554 may comprise a channel 560 to receive a set screw 504. The channel 560 enables the element 502 to translate as well as rotate in relation to the set screw 504. The prong 562 may comprise an inner side 558 which in one embodiment is approximately straight and of a length longer than the inner side of the prong 554, and the prong 562 may thus have a length longer than the length of the prong 554. Furthermore, the end of the prong 554 may be rounded in relation to the end of the prong 562.

Figure 6:
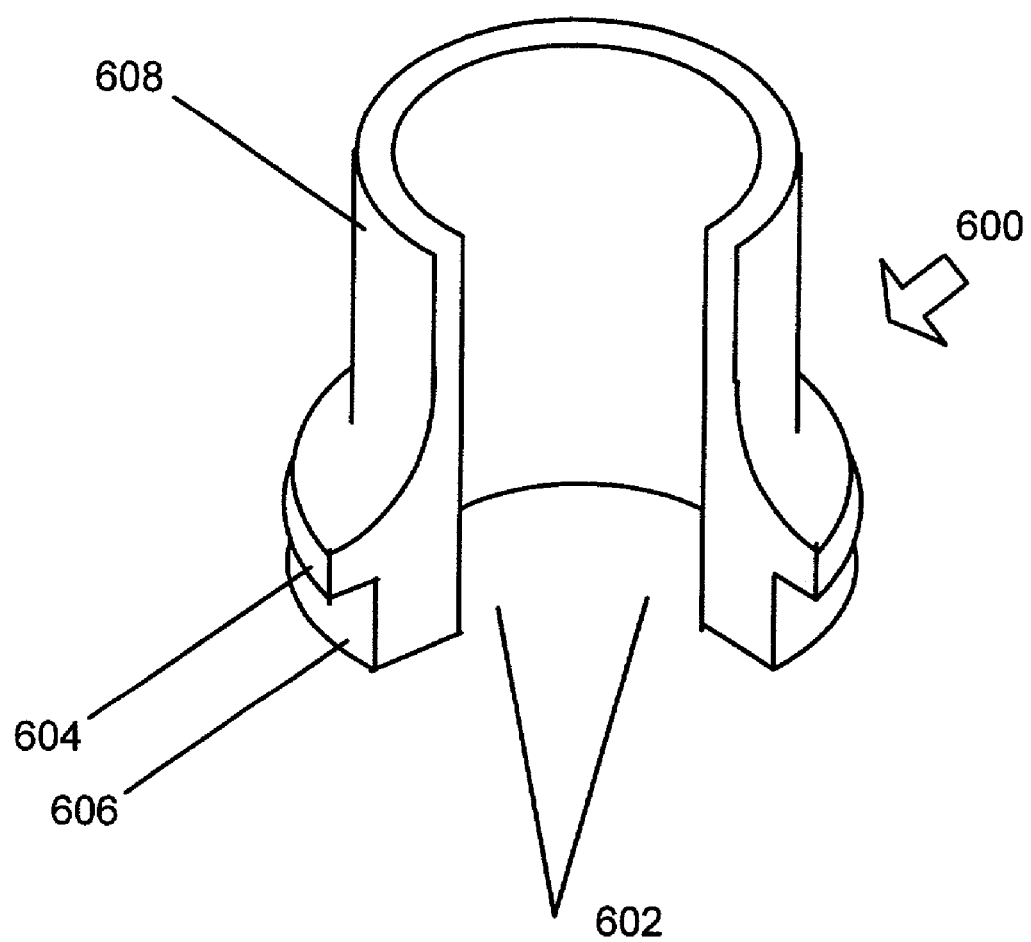
FIG. 6 shows a bushing embodiment in accordance with the present invention.

FIG. 6 shows a bushing embodiment 600 in accordance with the present invention. The bushing 600 comprises a cylindrical portion 608 which is belled to a lip 604. The lip 604 is offset to a base 606. The cylindrical portion 608 may be sized to be received by the opening of a conduit, pipe, or other material enclosing the wire, cable, or other material to pull. Alternately, the bushing may fit into the opening of a panel, tripod, or other structure aligned to receive the material to pull, and may include insets or recesses (not shown) to receive the ends of the thumb screws 510 or other retaining element. The base 606 may be sized to be received by the bay 514 of the bushing assembly 500. Opening 602 is formed in the bushing 600 to receive a rope, cable, or other length of pulling material without requiring the removal of the bushing 600 from the bushing assembly 500.

Figure 7A:
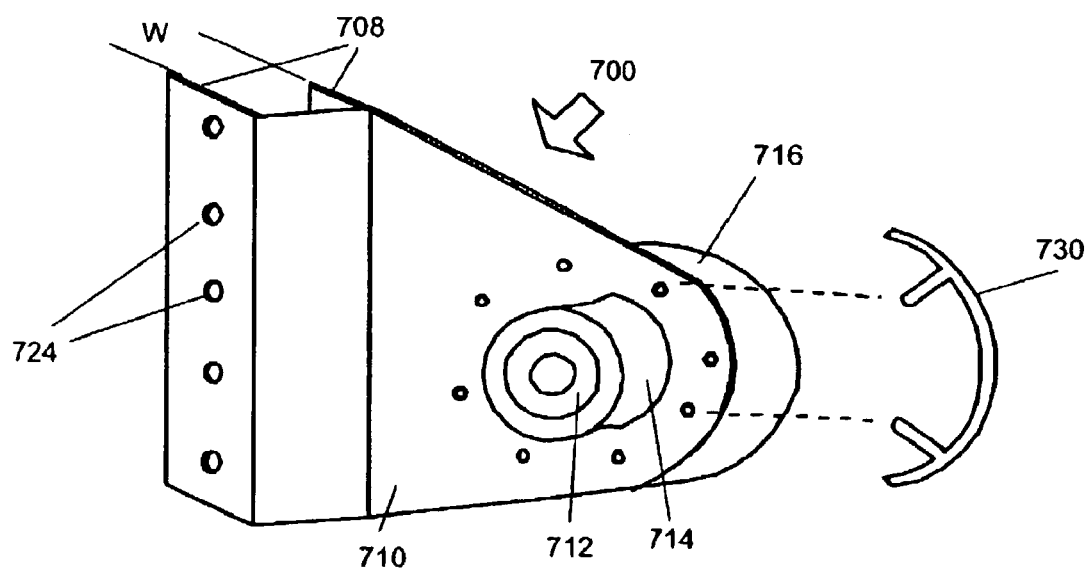
FIG. 7 shows an embodiment of a movable gearbox assembly in accordance with the present invention.
Figure 7B:
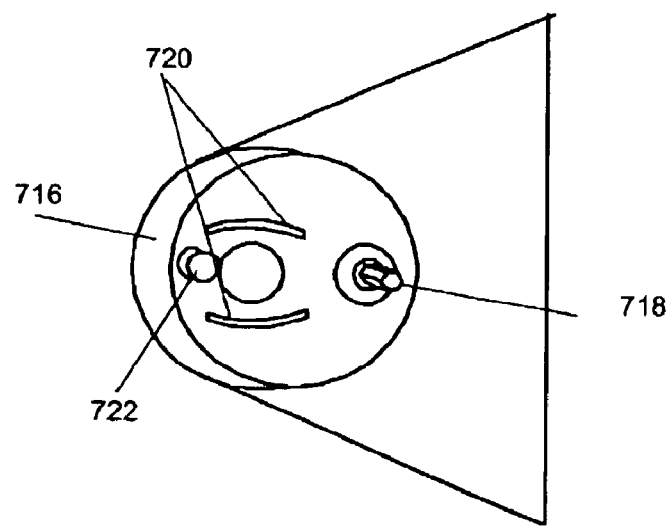

FIGS. 7A and 7B show an embodiment 700 of a movable gearbox assembly in accordance with the present invention. A gearbox 716 provides torque to a spindle 714 by way of a spindle axle 712. A bracket 708 of a mounting plate 710 provides for mounting of the gearbox assembly 700 along the length of a boom formed by the base bar 126 and any combination of sleeves 200 and extension bars 202. the bracket 708 has an inner dimension of approximately W, to receive elements of the boom also having a width of approximately W. e.g. the nub 206 of the sleeve 200 and the bars 126, 202. In other words, the gearbox assembly 700 may be mounted at numerous locations along the length of the boom, depending on the needs and convenience of the pulling application. A pin or other fastener may be inserted through the holes 724 to secure the gearbox assembly 700 to the nub or to the bars 202, 126.

A length of rope, cable, or other pulling material may be turned once or more around the spindle 714. Torque provided by the gearbox 716 may be applied to the pulling material, possibly in assistance to a pulling force provided by a human operator. The gearbox assembly 700 may further comprise a tie block 730 to secure the pulling material (for example, by 'tying off') to prevent backlash during breaks (rest periods) in the pulling operation.

The gearbox assembly 700 further comprises a drive axle 718 to which a torque may be applied by a torque source. One example of a torque source is a conventional right-angle drill, which may comprise a chuck to receive the drive axle 718. The gearbox 716 may comprise conventional gear arrangements. In one embodiment, the gear arrangement provides for a 5:1 ratio between the torque output to the spindle axle 712 and the torque provided to the drive axle 718. The brackets 720 may serve to position a drill or other torque source to the gearbox assembly 716. A bolt 718 or other protrusion, possibly adjustable, may serve to depress a trigger of a drill or other source of torque once such torque source is positioned to the gearbox 716. The torque source may be retained to the gearbox by way of straps or other fasteners.

In general, the gearbox acts as a movable torque converter which may be mounted along numerous locations of a boom formed from the combination of at least one sleeve 200 and bar 202.

FIG. 8 shows an embodiment 800 of a pulling apparatus in accordance with the present invention. Numerous other configurations of the elements herein described are also possible, and contemplated within the scope of the present invention. For example, the base assembly 100 may be omitted and the sleeve 200 mounted directly to a standard two inch trailer hitch. The gearbox 700 may be mounted to the nub 206 of the sleeve 200. Alternately, the gearbox assembly 200 may be mounted directly to one of the bars 126, 202. A power drill 802 comprising a chuck 806 is mounted between the brackets 720 of the gearbox 716. The drive axle 718 is received into the chuck 806 of the drill 802. A length of rope, cable, or other pulling material 804 may be directed through the opening 602 of the bushing 600, through the bay 514 of the bushing assembly 500, around the pulley 354 of the forearm pulley assembly 350, around the pulley 308 of the pulley assembly 300, and along the length of the boom formed by the sleeve(s) 200 and bar(s) 202. Note that the bushing 600 and bushing assembly 500 are illustrated, in this embodiment, in a position rotated approximately 90 degrees from the position they may have in an actual pulling situation. This is done so that the manner in which the opening 602 and the bay 514 receive the pulling material may be more readily perceived. A winding of the pulling material may be may around the spindle 714 of the gearbox assembly 700.

A human operator of the apparatus 800 may pull upon the end of the pulling material 804 and, upon encountering substantial resistance to the pull, may depress the foot pedal to couple the power source to the drill 802, thus activating the drill 802. The drill 802 provides torque to the drive axle 718 of the gearbox 716, which in turn steps up the torque and provides it to the spindle 714, assisting the human operator with the pulling operation.

The configuration of the apparatus 800 is such that tensions and stresses produced during a pulling operation may be directed substantially along the direction of the pull, and may be substantially localized at a point where the bushing 600 is received by a conduit, pipe, or other material enclosing the wire, cable, or other material to pull, or a panel, tripod, or other structure aligned to receive the material to pull. The apparatus 800 may thus prove highly stable and may function free of extensive bracing, even in high-tension pulling applications.

While certain features of the invention have been illustrated as described herein, many modifications, substitutions, changes and equivalents will now occur to those skilled in the art. It is, therefor, to be understood that the appended claims are intended to cover all such embodiments and changes as fall within the true spirit of the invention.

What is claimed is:

1. An apparatus comprising:
a sleeve sized to fit over a bar, the sleeve comprising a nub having substantially the same width as the bar;
a movable gearbox assembly comprising a mount to receive a power drill and a bracket sized to fit over either of the bar and the nub;
a mechanism to depress a power switch of the power drill when the power drill is mounted to the gearbox assembly; and
a foot pedal assembly to couple the power drill to a power source when the foot pedal is operated.

2. The apparatus of claim 1 further comprising:
a base assembly comprising a pivot for setting the angle of the boom, the boom comprising at least one bar and sleeve.

3. An apparatus comprising:
a base assembly comprising a pivotable base bar;
a boom comprising a sleeve sized to fit over an end of the base bar at a first end and to fit over an end of an extension bar at a second end, the sleeve comprising a nub having substantially the same width as the extension bar; and
a movable spindle assembly adapted to mount over either the extension bar or the nub of the sleeve.

4. The apparatus of claim 3 further comprising:
a foot pedal which, when operated, provides power to a torque source to turn the spindle.

5. The apparatus of claim 3, further comprising:
a first pulley assembly coupled to the boom and a second pulley assembly coupled to The first pulley assembly, the first pulley assembly comprising a first pulley axle substantially orthogonal to a second pulley axle of the second pulley assembly.

6. The apparatus of claim 5 further comprising:
a bushing assembly comprising a bay; and
a bushing having a lengthwise opening aligned with the bay.

* * * * *